(12) United States Patent
Doerr et al.

(10) Patent No.: US 11,814,113 B2
(45) Date of Patent: Nov. 14, 2023

(54) AIR DEFLECTION DEVICE IN THE UNDERBODY REGION OF A MOTOR VEHICLE AND MOTOR VEHICLE COMPRISING SUCH AN AIR DEFLECTION DEVICE

(71) Applicant: Mercedes-Benz Group AG, Stuttgart (DE)

(72) Inventors: Jasmin Doerr, Oberriexingen (DE);
Siegfried Zipperle, Aidlingen (DE);
Dirk Becker, Remseck (DE);
Alexander Mueller, Sindelfingen (DE);
Stefan Wiggen, Renningen (DE);
Waldemar Rauh, Calw (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 17/762,647

(22) PCT Filed: Sep. 1, 2020

(86) PCT No.: PCT/EP2020/074282
§ 371 (c)(1),
(2) Date: Mar. 22, 2022

(87) PCT Pub. No.: WO2021/058235
PCT Pub. Date: Apr. 1, 2021

(65) Prior Publication Data
US 2022/0332379 A1     Oct. 20, 2022

(30) Foreign Application Priority Data

Sep. 23, 2019  (DE) ..................... 10 2019 006 675.8

(51) Int. Cl.
*B62D 35/00*     (2006.01)
*B62D 35/02*     (2006.01)

(52) U.S. Cl.
CPC ........... *B62D 35/005* (2013.01); *B62D 35/02* (2013.01)

(58) Field of Classification Search
CPC .... B62D 35/001; B62D 35/005; B62D 35/02; B62D 37/02
(Continued)

(56) References Cited

U.S. PATENT DOCUMENTS

| 4,159,140 A |   | 6/1979 | Chabot et al. |
| 4,951,994 A | * | 8/1990 | Miwa ................... B62D 35/005 |
|             |   |        | 296/180.1 |

(Continued)

FOREIGN PATENT DOCUMENTS

| DE | 10 2009 057 656 A1 | 7/2010 |
| DE | 20 2011 005 504 U1 | 12/2011 |

(Continued)

OTHER PUBLICATIONS

PCT/EP2020/074282, International Search Report dated Nov. 11, 2020 (Two (2) pages).

(Continued)

*Primary Examiner* — Jason S Daniels
(74) *Attorney, Agent, or Firm* — Crowell & Moring LLP

(57) ABSTRACT

An air deflection device of a motor vehicle includes an air deflection element and a displacement kinematic system. The air deflection element is displaceable by the displacement kinematic system from an extended deflection position, in which the air deflection element with a deflection surface in a front region of the air deflection element in a longitudinal direction of the motor vehicle diverts an airflow hitting the air deflection element in an underbody region in a forward direction of travel of the motor vehicle, into a retracted position. The air deflection element is displaceable by the displacement kinematic system rearwards in the (Continued)

longitudinal direction of the motor vehicle and upwards in a vertical direction of the motor vehicle and is pushable back in a direction of the retracted position in an event of an obstacle-related force component acting on the air deflection element in the longitudinal direction of the motor vehicle.

4 Claims, 8 Drawing Sheets

(58) Field of Classification Search
USPC .......................................... 296/180.3, 180.5
See application file for complete search history.

(56) References Cited

U.S. PATENT DOCUMENTS

| | | | | |
|---|---|---|---|---|
| 8,702,152 | B1* | 4/2014 | Platto | B62D 37/02 296/180.1 |
| 8,887,845 | B2* | 11/2014 | McDonald | B62D 35/005 296/180.5 |
| 10,081,400 | B2* | 9/2018 | Abdoul Azizou | B62D 35/02 |
| 10,106,210 | B2* | 10/2018 | Miller | G01S 13/931 |
| 10,625,792 | B2* | 4/2020 | Shiga | B62D 35/005 |
| 10,953,934 | B2* | 3/2021 | Herlem | B62D 35/02 |
| 11,052,954 | B2* | 7/2021 | Shiga | B62D 37/02 |
| 11,161,557 | B2* | 11/2021 | Urbach | B62D 35/005 |
| 2019/0061839 | A1 | 2/2019 | Schmitt et al. | |
| 2019/0152543 | A1 | 5/2019 | Shiga et al. | |
| 2020/0094889 | A1* | 3/2020 | Shiga | B62D 35/005 |

FOREIGN PATENT DOCUMENTS

| | | |
|---|---|---|
| DE | 10 2010 053 463 A1 | 6/2012 |
| DE | 10 2015 116 343 A1 | 3/2017 |
| DE | 10 2017 214 769 A1 | 2/2019 |
| DE | 20 2018 107 288 U1 | 3/2019 |
| GB | 2539975 A | 1/2017 |

OTHER PUBLICATIONS

German-language German Office Action issued in German application No. 10 2019 006 675.8 dated Apr. 24, 2020 (Five (5) pages).

\* cited by examiner

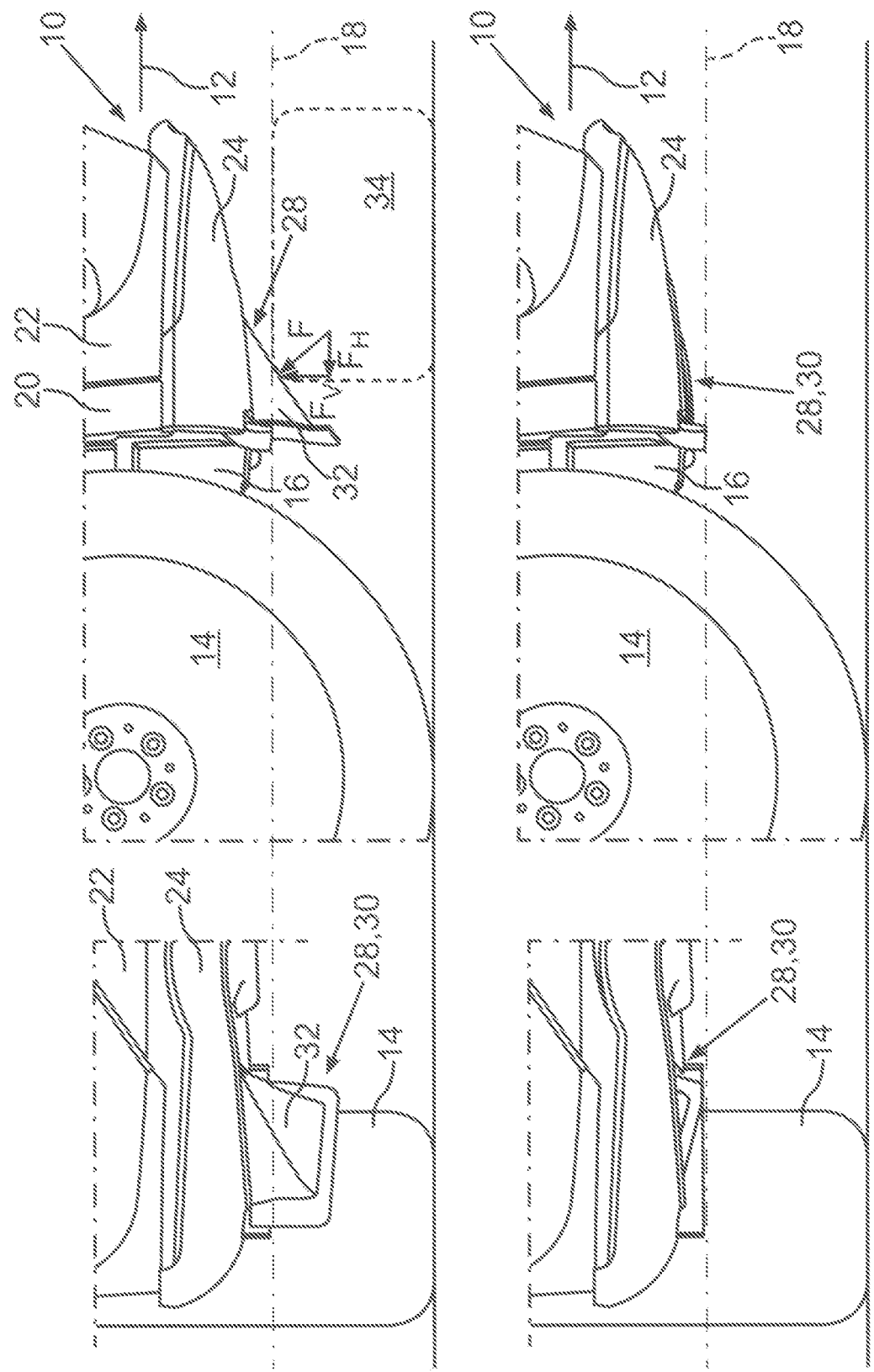

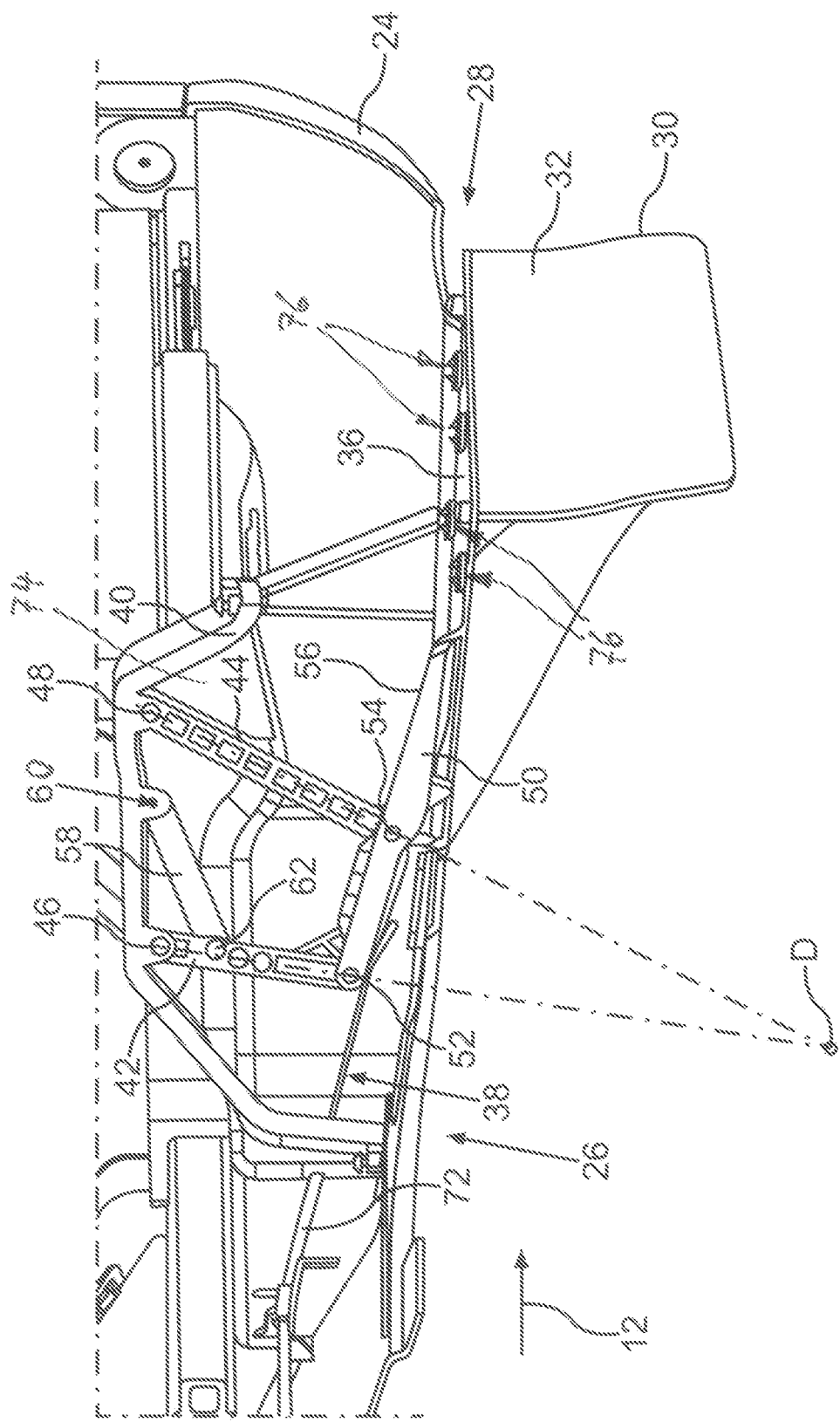

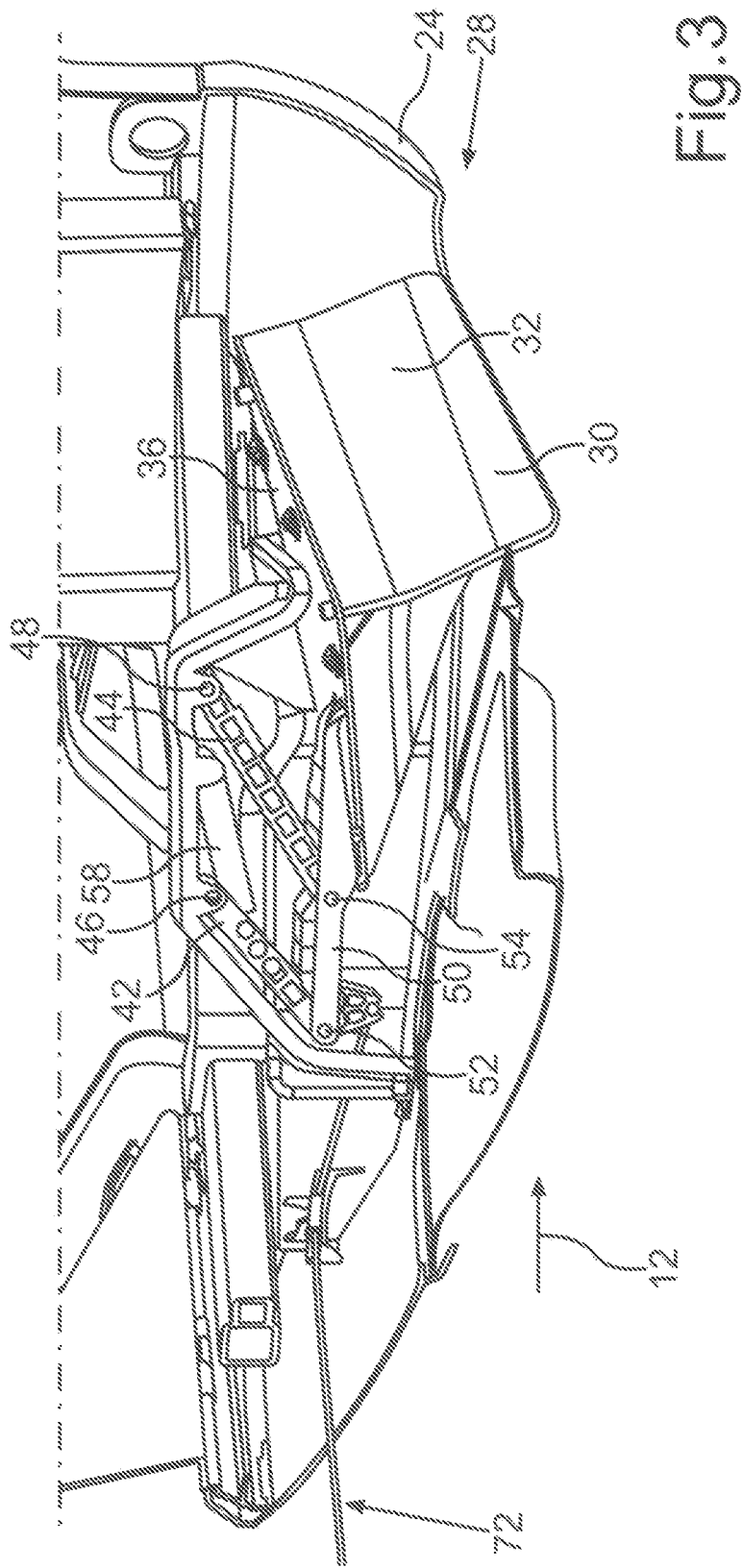

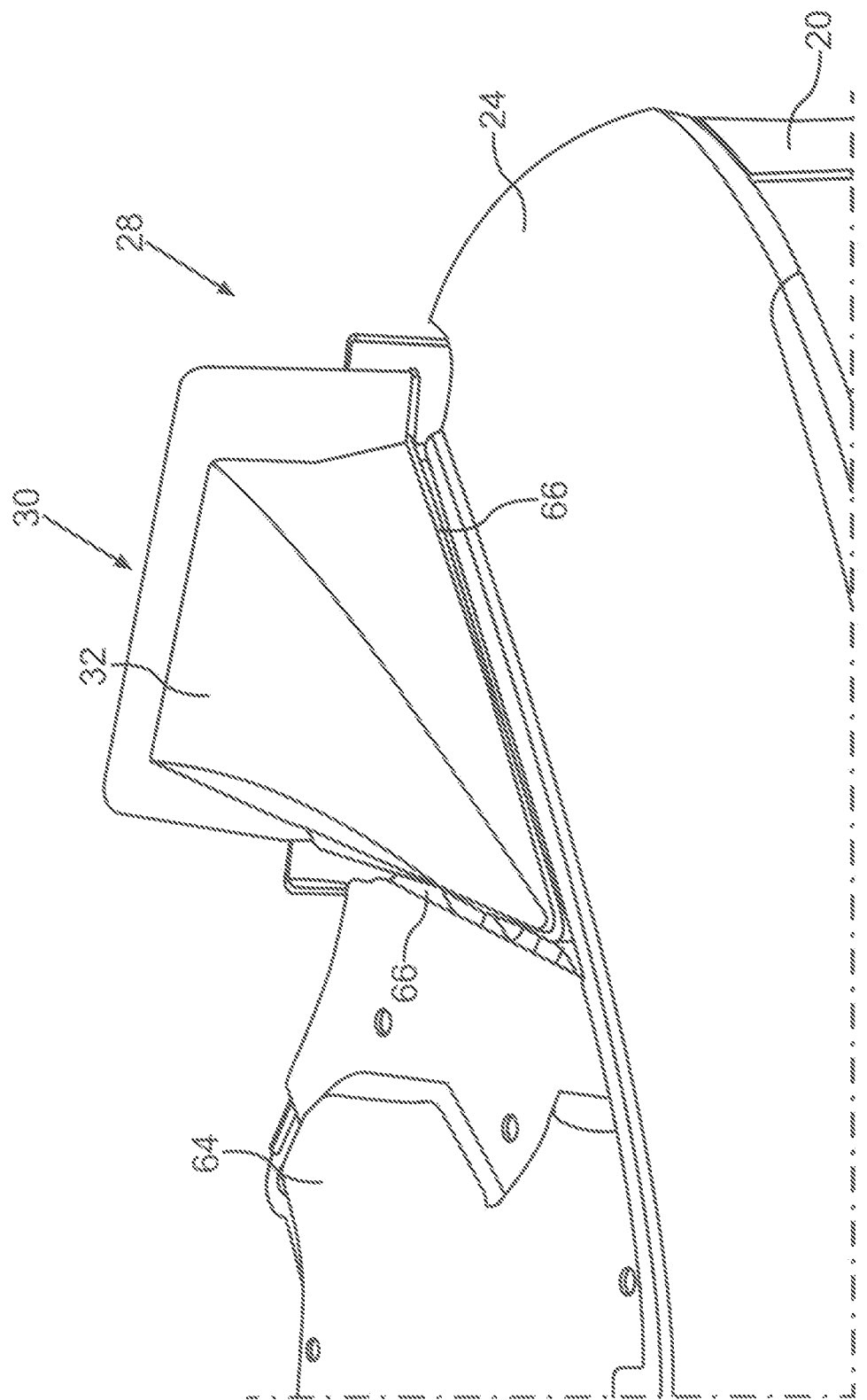

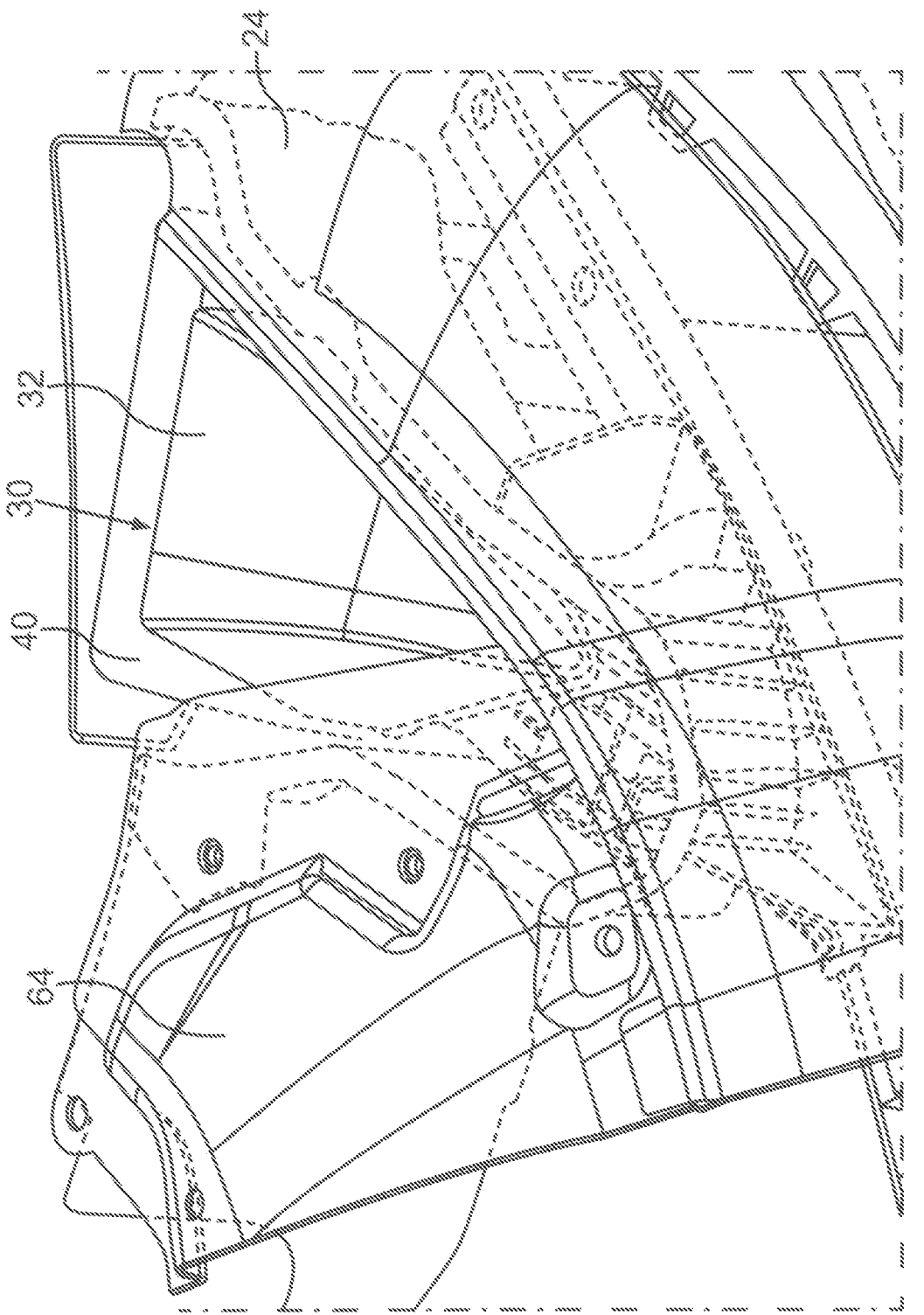

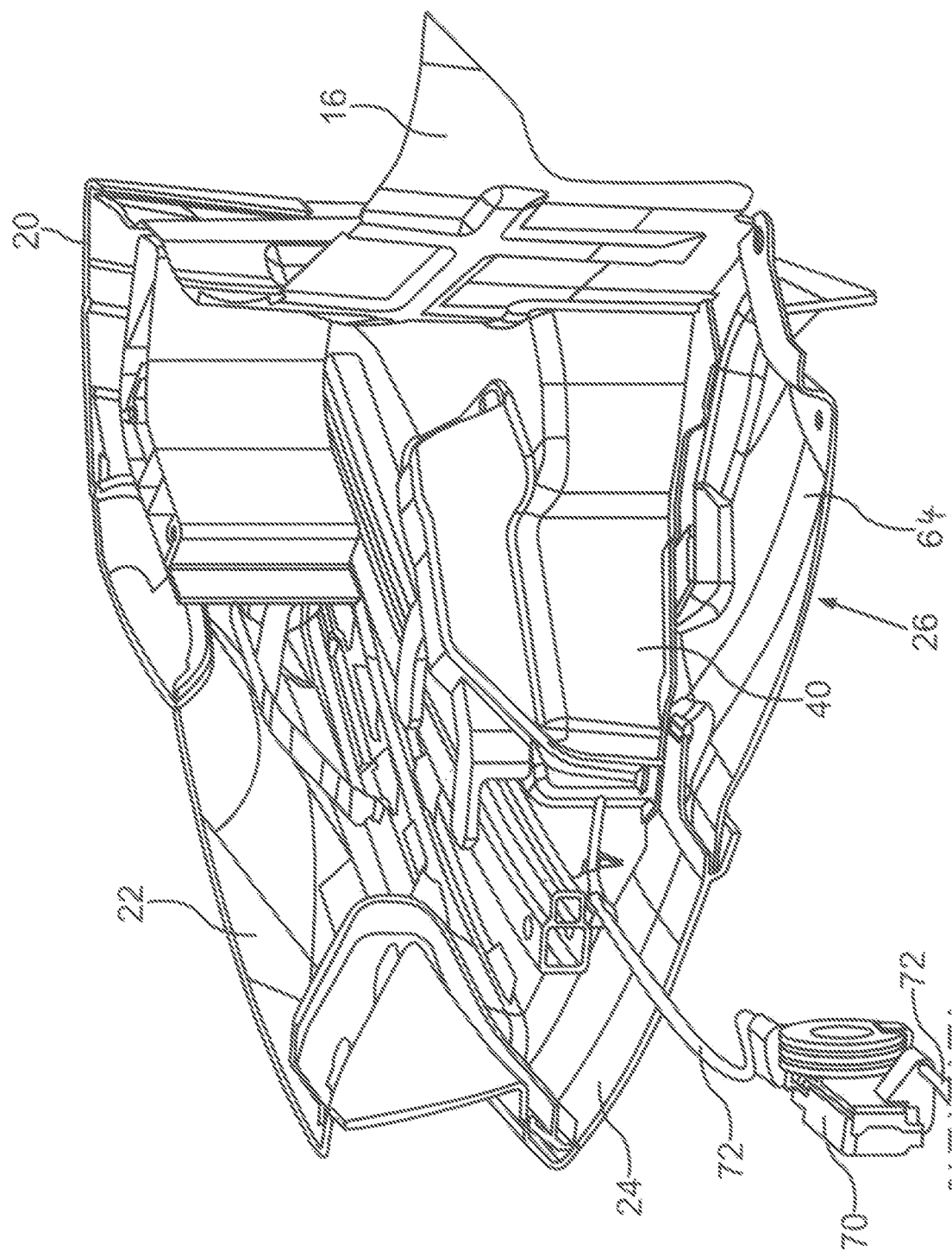

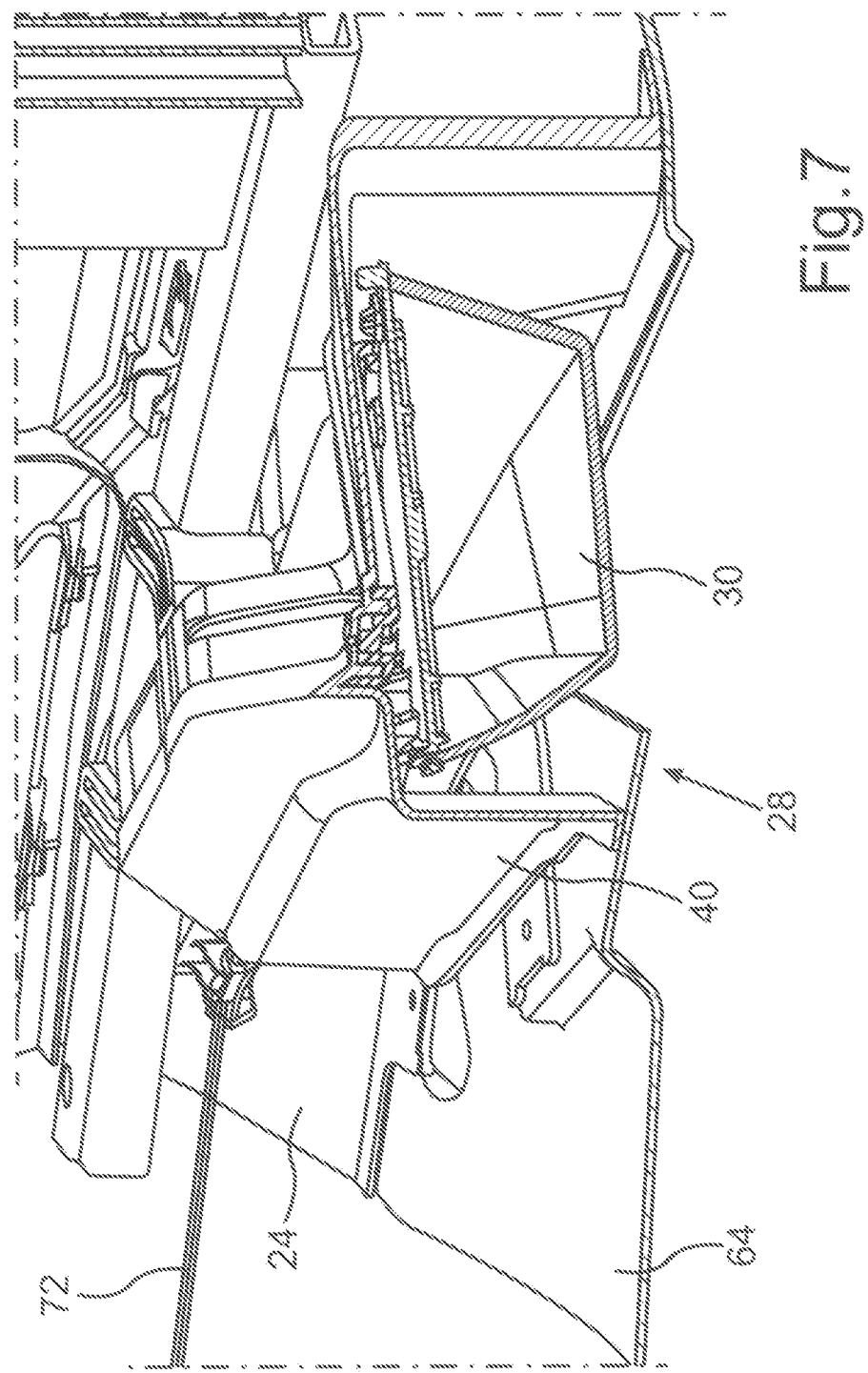

AIR DEFLECTION DEVICE IN THE UNDERBODY REGION OF A MOTOR VEHICLE AND MOTOR VEHICLE COMPRISING SUCH AN AIR DEFLECTION DEVICE

BACKGROUND AND SUMMARY OF THE INVENTION

The invention relates to an air deflection device in the underbody region of a motor vehicle and to a motor vehicle.

An air deflection device is described in DE 10 2010 053 463 A1, in which case, an associated air deflection element in the form of a wheel spoiler is provided in front of a vehicle wheel in the longitudinal direction of the vehicle and can be moved from an extended deflection position, in which the air deflection element or the wheel spoiler with a deflection surface provided in a front region of the air deflection element in the longitudinal direction of the vehicle diverts an airflow hitting the air deflection element in the underbody region in the forward direction of travel of the motor vehicle, into an at least partially retracted protected position by means of a displacement kinematic system. The wheel spoilers can each be displaced here from the deflection position into the at least partially retracted position along a guide oriented in the vertical direction of the vehicle. The wheel spoilers arranged in their deflection position are intended to prevent the air from hitting the tyre of the particular wheel head-on while the motor vehicle is in motion, which would lead to an undesirable increase in the air resistance of the motor vehicle. In order to protect the wheel spoilers from damage during off-road driving, for example, they can actively move back into their protected position further away from the road. A disadvantage of the known air deflection device is that when driving over an unexpected obstacle on the road, the wheel spoiler arranged in the air deflection device position may be damaged or even torn off in the event of a collision.

DE 20 2018 107 288 U1 shows an air deflection device which is arranged on the underbody of a passenger car in a front end region and comprises an air deflection device which is mounted pivotably about an axis via a hinge arrangement arranged on the rear edge of the air deflection device. The flat air deflection element, which covers practically the entire front end of the vehicle from below, can be pivoted about the axis between a lowered activation position, in which it is folded down at its front edge in the direction of the road, and a folded-in rest position. In this case, the air deflection element is pretensioned in the direction of its activation position by means of a helical spring, so that when driving over an obstacle, the air deflection element can fold back and thus take evasive action. A motor-driven cable is provided to move the air deflection element back into its rest position. It has been found that when an obstacle is hit, the air deflection element does not always fold back into its rest position and damage may occur.

An air deflection device of the type in question for the underbody region of a motor vehicle is described in US 2019/0152543 A1.

It is the object of the present invention to create an air deflection device of the type mentioned above, in which damage to the air deflection element as a result of driving off-road or over obstacles can be avoided in a more reliable manner and which can be made functionally reliable in a simple and economical way.

The air deflection device according to the invention comprises an air deflection element which can be displaced by means of the displacement kinematic system in a superimposed displacement movement rearwards in the longitudinal direction of the vehicle and upwards in the vertical direction of the vehicle. The deflection surface of the air deflection element is designed at least in a partial region as a ramp—preferably inclined obliquely in the longitudinal direction of the vehicle from the front top to the rear bottom. The air deflection element is displaced or can be displaced into the retracted position by means of the displacement kinematic system in the event of an obstacle-related force component acting on the air deflection element in the longitudinal direction of the vehicle. As a result of the design of the displacement kinematic system and/or the shape of the air deflection element a force component, acting in the longitudinal direction of the vehicle, of a force acting as a result of an impact against an obstacle_leads to a displacement of the air deflection element into the at least partially retracted position, in order thereby to avoid damage to the air deflection element. A core of the present invention is therefore that the air deflection element is displaced automatically or under forced control into the retracted position when it encounters an obstacle as a result of the force component acting rearwards in the longitudinal direction of the vehicle which is then introduced and which arises as a result of the forward direction of travel of the motor vehicle. This effectively prevents damage to the air deflection device and also to parts of the underbody adjacent to the air deflection device or other components in the underbody region of the motor vehicle.

The air deflection element of the air deflection device according to the invention is a wheel spoiler which is arranged in front of an associated wheel, in particular a front wheel, of the motor vehicle in the longitudinal direction of the vehicle. By means of such a wheel spoiler, particularly favorable aerodynamic effects can be achieved in the underbody region, for example in order to save energy for driving the motor vehicle.

Due to the air deflection element, which is preferably designed at least in a partial region as a ramp or slope or tilted surface inclined from the front top to the rear bottom in the longitudinal direction of the vehicle, the air deflection element is automatically displaced particularly favourably and reliably into the at least partially retracted position when it contacts an obstacle. More precisely, a force acting rearwards on the air deflection element in the longitudinal direction of the vehicle is hereby converted or decomposed into a force acting on the air deflection element in the vertical direction of the vehicle and moves the air deflection element into the retracted position.

Due to the provision of the slope, it is also not possible for the air deflection element or the air deflection surface to become caught with the obstacle, which could lead to the air deflection element being torn off or damaged in a similar way. Rather, the correspondingly inclined ramp is preferably relatively smooth and also selected, for example, in terms of the material thickness and/or material composition, so that no damage can occur to the air deflection element when the obstacle contacts the deflection surface.

Due to the displacement kinematic system provided in order to displace the air deflection element in a superimposed displacement movement rearwards in the longitudinal direction of the vehicle and upwards in the vertical direction of the vehicle, an obstacle-related force component acting rearwards in the longitudinal direction of the vehicle can also be converted particularly favourably—parallel to the displacement movement rearwards in the longitudinal direction of the vehicle—into a displacement movement upwards in the vertical direction of the vehicle. Such a displacement movement of the air deflection element upwards in the vertical direction of the vehicle is necessary specifically to increase the ground clearance of the motor vehicle in the underbody region in order to avoid damage to the particular air deflection element. More precisely, a force acting rearwards on the air deflection element in the longitudinal direction of the vehicle is thus converted into a movement of the air deflection element in the vertical direction of the vehicle into the retracted position by suitable design of the displacement kinematic system. This can be achieved, for example and in particular, by designing a suitable multi-joint lever kinematic system; alternatively, however, a slotted guide system or the like would also be conceivable.

It has proven to be particularly advantageous if the displacement kinematic system is designed as a multi-joint lever kinematic system, in particular as a four-joint lever kinematic system. By means of such a multi-joint lever kinematic system, a displacement movement of the air deflection element into the retracted position as the result of an obstacle-related force component acting on the air deflection element in the longitudinal direction of the vehicle can be generated in a particularly advantageous manner. This results in a particularly stable support of the air deflection element when it contacts an obstacle as well as a particularly favorable and reliable displacement movement into the retracted position.

Furthermore, it is provided in accordance with the invention that a displacement unit is associated with the displacement kinematic system, by means of which displacement unit the air deflection element is movable from the retracted position into the deflection position. In other words, the particular air deflection element is preferably moved into the deflection position by means of a displacement unit, as this leads to a particularly reliable displacement. Alternatively, however, it would also be conceivable to effect the displacement movement of the air deflection element from the retracted position into the deflection position, for example merely as a result of a dynamic pressure arising in the region of the air deflection element. The particular air deflection element can also be controlled with the displacement unit in a speed-dependent manner, for example.

In accordance with the invention it is also provided that the displacement unit comprises a spring element by means of which the air deflection element is movable from the retracted position into the deflection position and/or can be held in the deflection position against a stop. This results in a particularly reliable displacement and holding of the air deflection element into/in the deflection position. In addition, a displacement of the air deflection element into the retracted position against the force of the spring element can be effected in a simple manner in the event of an obstacle-related force component acting on the air deflection element in the longitudinal direction of the vehicle.

A particularly favorable remote actuation of the particular air deflection element can be achieved via a pulling means. Such a pulling means is particularly easy to operate and is also extremely reliable. For example, a Bowden cable is particularly suitable.

A further advantageous embodiment of the invention provides that a plurality of air deflection elements, in particular a particular wheel spoiler per vehicle side, is movable from the retracted position into the deflection position by means of the displacement unit. This results in a particularly favorable structural simplification of the air deflection device, since a plurality of air deflection elements can be actuated with one and the same displacement unit.

Lastly, it has been shown to be advantageous if the particular air deflection element with associated displacement kinematic system is mounted in a housing. In this way, the air deflection device can be manufactured as a unit that can be pre-assembled to the greatest possible extent. In addition, the particular air deflection element is particularly favourably accommodated at least partially within the associated housing in the retracted position.

Further advantages and details of the invention will become apparent from the following description of a preferred exemplary embodiment and from the drawings.

The features and combinations of features mentioned above in the description as well as the features and combinations of features mentioned below in the description of the figures and/or shown alone in the figures can be used not only in the combination indicated in each case, but also in other combinations or on their own, without departing from the scope of the invention.

BRIEF DESCRIPTION OF THE DRAWINGS

FIG. 1 in each case shows a front view of a detail and a side view of a detail of an underbody region of a motor vehicle with an air deflection device with an air deflection element arranged on the front side of a corresponding front wheel, which air deflection element is shown in the upper illustrations in an extended deflection position, and which, in the two lower illustrations, is displaced into an at least partially retracted position by means of a displacement kinematic system, wherein the air deflection element has been displaced into the retracted position by means of the displacement kinematic system in the event of an obstacle-related force component acting on the air deflection element in the longitudinal direction of the vehicle and generated by a foreign body during forward travel of the motor vehicle;

FIG. 2 is a sectional view of a detail through the air control system according to FIG. 1 along a sectional plane running in the vertical direction of the vehicle and in the longitudinal direction of the vehicle, wherein the air deflection element is held by the displacement kinematic system in its deflection position influencing the aerodynamics of the motor vehicle;

FIG. 3 is a sectional view of a detail of the air deflection device analogous to FIG. 2, wherein the air deflection element has been moved into the retracted position by means of the displacement kinematic system as the result of an obstacle-related force component acting on it;

FIGS. 4*a*, 4*b* are respective perspective views from below of the air deflection device with the air deflection element in the deflection position and in the at least partially retracted position;

FIG. 5 is a perspective view of the air deflection device according to the invention in the underbody region, wherein in particular an integration of the air deflection element into the adjacent cladding elements as well as a displacement unit of the displacement kinematic system can be seen;

DETAILED DESCRIPTION OF THE DRAWINGS

Figure 6:
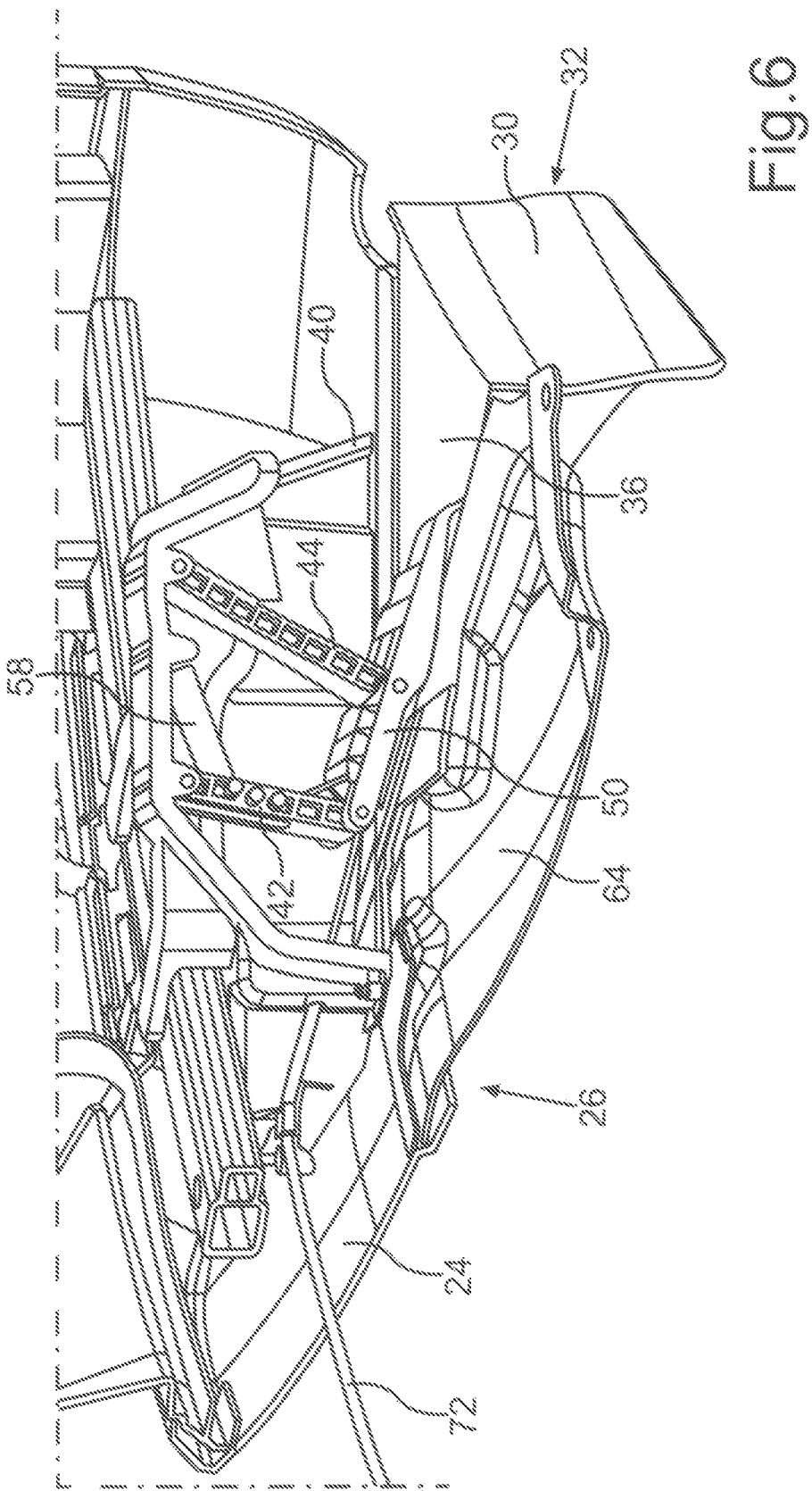
FIG. 6 is a further perspective view of the air deflection device in the underbody region analogous to FIG. 5, but with the housing shown cut away, in which the displacement kinematic system of the air deflection element located in the deflection position is mounted; and in FIG. 7 is a view of a detail and a perspective view of the air deflection device with the air deflection element in the retracted position.

FIG. 1 shows in each case a front view of a detail and a side view of an underbody region of a passenger car near a vehicle nose 10. A right-hand front wheel 14, which is also recognisable in the various front views according to FIG. 1, can be seen in relation to a forward direction of travel indicated by an arrow 12. The front wheel 14 is accommodated in a wheel housing which is clad on the outer circumferential side or on the inside by a wheel housing cladding 16. This wheel housing cladding 16 extends downwards to a horizontal plane indicated by a dashed line 18, which is parallel to the ground, this being flat in the present case, and is also referred to as the ground clearance interface.

On the front side of the wheel housing cladding 16, various cladding elements 20, 22 of the wheel housing or of the vehicle nose 10 can be seen, which are often—as is also the case with the shown part of the wheel housing cladding 16—associated with a front end module of the passenger car. Furthermore, a cladding element 24 of an underbody cladding 26 is shown on the underside and is also associated with the front end module in this exemplary embodiment. In order to use the air deflection device 28 described below in conjunction with a motor vehicle, it is not absolutely necessary for the latter to have a front end module.

Of an air deflection device 28 arranged in the underbody region, FIG. 1 shows in particular an air deflection element 30, which in this case is arranged as a so-called wheel spoiler in front of the corresponding front wheel 14 in the longitudinal direction of the vehicle. As can be seen in particular from the upper front view of FIG. 1, the air deflection element 30 arranged here in an extended air deflection position is—viewed in the transverse direction of the vehicle—at least partially laterally overlapped with the corresponding front wheel 14. In particular with a deflection surface 32 provided in a front region of the air deflection element 30 in the longitudinal direction of the vehicle (arrow 12), in the deflection position of the air deflection element 30 shown in the two upper illustrations of FIG. 1, an airflow hitting the air deflection element 30 in the underbody region in the forward direction of travel of the vehicle can be deflected so that the travel-related airflow in this region does not collide head-on with the front wheel 14, whereby an improved flow of air against the corresponding front wheel 14 can be achieved in order to improve the overall aerodynamics of the motor vehicle in the underbody region and hereby in particular save energy when driving the motor vehicle.

As can also be seen from the two upper illustrations in FIG. 1, the wheel spoiler or air deflection element 30, and in particular its deflection surface 32, protrudes downwards from the rest of the underbody cladding 26. The wheel spoiler or air deflection element 30 is intended here to prevent the air from hitting the associated tyre head-on when the vehicle is moving, thereby increasing the flow resistance of the vehicle. In the deflection position, the airflow coming from the front consequently hits the deflection surface 32 of the air deflection element 30, is diverted accordingly, flows along the particular air deflection element 30 and is guided in a targeted manner by the specific shape of the wheel spoiler or air deflection element 30, so that the air flows better against the front wheel 14 arranged behind the spoiler or deflection element or the air is guided at least partially laterally past it, which is the case, for example, in the region of the inner flank of the front wheel 14. This improves the aerodynamic properties in the underbody region with the advantages already described.

However, when the motor vehicle is being driven in the forward direction, driving situations may occur in which the air deflection element 30 contacts a foreign object 34 or another type of obstacle as indicated in the upper right illustration of FIG. 1. In particular, such constellations arise during off-road driving or when driving over obstacles in urban areas, for example when driving over kerbs or other obstacles unexpectedly located on the road.

As can be seen from FIG. 1 in the upper right illustration, an impact of the extended air deflection element 30, arranged in its air deflection position, against an obstacle 34 leads to an obstacle-related force F, which comprises, in particular depending on the driving speed in the forward direction of travel, a force component $F_H$ acting against the forward direction of travel in the longitudinal direction of the vehicle as well as a vertical force component $F_V$ acting upwards in the vertical direction of the vehicle.

In the case of such a horizontal force component $F_H$ acting in particular in the longitudinal direction of the vehicle against the forward direction of travel, i.e., rearwards in the longitudinal direction of the vehicle, considerable damage or even complete destruction of the air deflection element 30 may occur. For this reason, in the present case the air deflection element 30 is displaceable from the deflection position shown in the two upper figures, in which the air deflection element is designed as a wheel spoiler influencing in particular the flow against the front wheels 14, into the at least partially retracted position in the vertical direction of the vehicle shown in the two lower illustrations of FIG. 1. In the present case, this is done on the one hand by means of and through a displacement kinematic system explained in more detail below. In the present exemplary embodiment, the air deflection element 30 is displaced upwards to above the plane or so-called interface of the ground clearance shown by line 18, so that the air deflection element 30 is at least not arranged lower than other parts of the underbody cladding 26 in relation to the vertical direction of the vehicle.

With reference to FIGS. 2 and 3, the specific design of the present air deflection device will now be explained on the basis of respective sectional views of a detail taken along a sectional plane running in the vertical direction of the vehicle and in the longitudinal direction of the vehicle.

In particular, when looking at FIGS. 2 and 3 together, it can first be seen that the air deflection element 30 in FIG. 2 is in its deflection position according to the two upper illustrations of FIG. 1, and in FIG. 3 is in its at least partially retracted position according to the two lower illustrations in FIG. 1.

The air deflection element 30 is produced substantially as a wedge-shaped hollow body made, for example, of a plastics material, wherein this hollow body is closed on the upper side by a cover 36. The air deflection element 30 is mounted on a downwardly open housing 40 by means of a displacement kinematic system 38, outside which the air deflection element 30 is arranged in the deflection position and inside which the air deflection element 30 is at least partially arranged in the retracted position.

The displacement kinematic system 38 is designed in the present case as a multi-joint lever kinematic system in the form of a four-joint lever kinematic system with two control levers 42, 44, which are mounted at corresponding bearing points 46, 48 on the housing 40. At their ends opposite the bearing points 46, 48, the two control levers 42, 44 are connected in an articulated manner to a bearing lever 50 in the region of respective bearing points 52, 54, wherein the bearing lever 50 has a front end 56 via which it is connected to the air deflection element 30 or, more precisely, to the cover 36.

Looking together at FIGS. 2 and 3, it can be seen that the control levers 42, 44 and the bearing lever 50 with the bearing points 46, 48 and 52, 54 together form the four-joint lever kinematic system by means of which the air deflection element 30 can be displaced from the deflection position according to FIG. 2 into the retracted position according to FIG. 3. This results in a superimposed displacement movement rearwards in the longitudinal direction of the vehicle and upwards in the vertical direction of the vehicle, which can be seen in particular from the positions of the air deflection element 30 relative to the housing 40. The displacement movement of the air deflection element 30 is performed here about a theoretical pivot point D, which is shown in FIG. 2 and results from an imaginary extension of the two control levers 42, 44, passing through the respective bearing points 46, 48 and 52, 54.

It is important that at least the bearing points 46, 48 and—as in the exemplary embodiment shown in FIGS. 2 and 3—possibly also the bearing points 52, 54 of the control levers 42, 44 are arranged above the air deflection element 30 and thus its air deflection surface 32 in the vertical direction of the vehicle (z-direction in the vehicle coordinate system). In the event of a collision-related force acting on the air deflection surface 32, the bearing points are by no means in the direction of action of the collision force, and therefore the collision force leads to a pivoting of the air deflection element 30 rearwards and simultaneously upwards against the forward direction of travel of the motor vehicle due to the force breakdown at the inclined surface of the air deflection element 30.

As can also be seen from FIGS. 2 and 3, the lever 42 is supported against the housing 40 via a spring element 58. Here, the spring element 58 has joints 60, 62 one at each end, via which the spring element 58 is connected to the control lever 42 and the housing 40. The spring element 58 causes the air deflection element 30 to be moved and displaced into the deflection position by the spring force, with the aid of the displacement kinematic system 38 or the four-joint lever kinematic system, or to be held against the stop 74 in the deflection position. The spring force of the spring element 58 is determined here in such a way that it withstands the forces acting on the air deflection element 30 or on the deflection surface 32 when a corresponding airflow is incident, even at higher driving speeds.

However, the spring element 58 or its force is again such that the air deflection element 30 is displaced into the avoidance position or retracted position according to FIG. 3 when it contacts a foreign body or an obstacle 34, in particular as a result of the obstacle-related force component $F_H$ acting on the air deflection element 30 in the longitudinal direction of the vehicle or horizontally. The spring element 58, which is designed in the present case as a tension spring or the like, is therefore tensioned or tensioned more when an obstacle-related force component $F_H$ is effective and an associated displacement occurs. During the return movement from the retracted position to the deflection position, the spring element 58, conversely, is partially relaxed.

Furthermore, as can be seen in particular in FIG. 1 from the illustration on the top right, the deflection surface 32 of the air deflection element 30 is designed, at least in an upper partial region, as a ramp inclined in the longitudinal direction of the vehicle from the front top to the rear bottom. This has the advantage that, when the air deflection element 30 contacts the foreign body or obstacle 34, as shown in FIG. 1 on the top right, it is displaced or pushed back in the desired displacement movement in the longitudinal direction of the vehicle rearwards and at the same time in the vertical direction of the vehicle upwards. Thus, while on the one hand the suitable design of the displacement kinematic system 38 leads to the conversion of the force component $F_H$ acting rearwards on the air deflection element 30 in the longitudinal direction of the vehicle into a corresponding force for lifting the air deflection element 30, alternatively or additionally on the other hand the ramp also serves to bring about a corresponding conversion of the force component $F_H$ acting rearwards on the air deflection element 30 in the longitudinal direction of the vehicle into a corresponding force for lifting the air deflection element 30. The suitable design of the displacement kinematic system 38 and the ramp thus both serve the purpose of a corresponding conversion of the force component $F_H$ acting rearwards on the air deflection element 30 in the longitudinal direction of the vehicle into a corresponding force for lifting the air deflection element 30. Both measures have a particularly advantageous joint effect. However, both measures are also conceivable and highly effective individually, for example. Thus, it would also be conceivable within the scope of the invention to design an air deflection device without such a ramp if the displacement kinematic system permits and effects a corresponding displacement movement of the air deflection element rearwards in the longitudinal direction of the vehicle and upwards in the vertical direction of the vehicle. Conversely, a slotted guide system for guiding the air deflection element 30 substantially upwards in the longitudinal direction of the vehicle if the air deflection element 30 has the described ramp in the region of the deflection surface 32 would also be conceivable, since this also ensures that a force component $F_H$ acting rearwards on the air deflection element 30 in the longitudinal direction of the vehicle is converted into a corresponding force for lifting the air deflection element 30. Due to the design of the air deflection device surface 32 as an air deflection element 30, it would thus also be conceivable, if necessary, that a slotted guide system or a pivot bearing about a fixed pivot point is provided for the air deflection element 30 instead of the four-joint lever kinematic system, since the deflection surface 32 running at an incline ensures that a force component $F_H$ acting rearwards on the air deflection element 30 in the longitudinal direction of the vehicle would lead in any case, as the result of the inclined orientation from top front to rear bottom, to a displacement movement of the air deflection element upwards in the vertical direction of the vehicle by way of a force $F_V$. In other words, if an inclined deflection surface 32 were provided, it would also be possible to displace the air deflection element 30 along a linear or curved guide running in the vertical direction of the vehicle, more specifically as the result of the obstacle-related force generated by the deflection surface 32 and acting on the air deflection element 30 in the vertical direction of the vehicle.

In FIGS. 4a and 4b, the air deflection device can be seen in a perspective bottom view in the region of one of the two air deflection devices 30 arranged laterally in front of the associated front wheel 14. In FIG. 4a the air deflection element is shown in its deflection position, i.e., extended downwards. In FIG. 4b, the air deflection element 30 is at least partially or, in the present case, even at least substantially completely accommodated in the retracted position in the housing 40. According to FIG. 4a, it can be seen in particular that the air deflection element 30, the cladding element 24 adjoining the air deflection element 30 from the front, and a further underbody cladding element 64 are adapted to the shape of the air deflection element 30 in the deflection position. Consequently, only narrow gaps 66 or joints are formed between the cladding elements 24 or 64 and the air deflection element 30.

FIG. 5 shows a perspective sectional view of the cladding elements 20, 22, 24 of the front end module of the passenger car as well as the cladding element 64 of the underbody cladding 26 with the integrated air deflection device from an inner side of the motor vehicle. The wheel housing cladding 16 is also visible.

FIG. 6 shows, analogously to the illustration according to FIG. 5, the air deflection device 28 in the region of the various cladding elements 20 to 24 and 64. In contrast to the illustration according to FIG. 5, in particular the housing 40 is shown in section in FIG. 6, so that the displacement kinematic system 38 is recognisable.

Looking at FIGS. 5 and 6 together, it can be seen here that the displacement kinematic system is connected to a displacement unit which comprises an actuator 70. The actuator 70 is connected to the four-joint lever kinematic system, more precisely to the control lever 42, via a pulling means 72 in the form of a Bowden cable. In the present exemplary embodiment, moreover, the actuator 70 is also connected to the air deflection element 30 on the other side of the vehicle. In other words, both air deflection elements 30 in front of the corresponding front wheels 14 are actuated by one and the same actuator 70.

Via this actuator 70, the air deflection elements 30 can be pulled out of the deflection position into the retracted position against the spring force of the corresponding spring element 58. Conversely, the spring force of the spring elements 58 is used to extend the air deflection elements 30, so that the pulling means 72 only has to be released by the actuator 70. By means of the actuator 70, a speed-dependent control of the position of the air deflection elements 30 is thus possible. In particular, it is conceivable here that the various air deflection elements or wheel spoilers 30 are arranged extended in the deflection position at speeds above 60 km/h and retracted at speeds below 60 km/h, since only minor aerodynamic effects occur below this speed. This also means that during a substantial part of the vehicle's journeys in urban areas and also in open terrain, during which the desired effects of the air deflection element are not present or are present only to a small extent due to the relatively low driving speed, the air deflection element is arranged in its retracted protected or non-use position and thus cannot be damaged by obstacles on the ground. Preferably, the air deflection element is only retracted from a certain driving speed—preferably automatically by means of a corresponding control system—at which speed at least sufficient aerodynamic effects are achieved.

Lastly, FIG. 7 shows again in a perspective sectional view the accommodation of the air deflection element 30 in the retracted position within the housing 40. The housing 40 results in a complete encapsulation of the installation space of the air deflection element by means of the housing 40. In addition, the housing 40 with the displacement kinematic system 38 and the particular air deflection element or wheel spoiler 30 can be designed as a unit that can be pre-assembled and that can then be mounted in the region of the front end module or otherwise in the underbody region. The housing 40 is preferably designed in such a way that the engine compartment is shielded against dirt/water/snow ingress and the exhaust air ducting of the cooling system is not affected by the active wheel spoiler. The housing 40 (encapsulation) prevents a negative change to the external noise when using active wheel spoilers.

It can be seen from FIG. 2 that the bearing lever 50 and the cover 36 are formed in one piece and are connected to the air deflection element 30 via the clips 76. These clips 76 can, if necessary, be designed as a sacrificial part in the event that contact with a foreign body results in damage.

To summarise, it should be noted that in the case of the air deflection device according to the invention, it is particularly advantageous that in the event of misuse, i.e., in the event of an unintentional impact of a foreign body against the extended wheel spoiler/air deflection element 30, the latter can be activated by means of the multi-joint kinematic system described on the basis of the figures without self-locking and can be folded in against the spring force of the spring element 58 in a non-destructive manner. This requires a force or impulse acting on the air deflection element 30 in the z-direction, i.e., in the vertical direction of the vehicle, i.e., away from the road. This is achieved via the air deflection element 30, also known as a run-on body, which has primarily an aerodynamic function. Its secondary function is to break down the force acting on the air deflection element 30 by means of an obstacle by means of the deflection surface 32, which runs from the bottom rear to the top front as seen in the forward direction of travel of the motor vehicle and is thus arranged in the manner of a ramp. The impact of a foreign body on the deflection surface 32, which runs in an inclined manner forwards and upwards and thus at a certain angle to the road, generates a force component in the z-direction, i.e., in the vertical direction upwards away from the road, as a result of the incline of the run-on body, which force component causes the wheel spoiler/the air deflection element 30 including its displacement kinematic system to retract.

Furthermore, it is particularly advantageous in the exemplary embodiment of the air deflection device described on the basis of the figures that the active air deflection element 30 does not leave a hole in the underbody region in the retracted state, this being realised by means of the preferably pot-like housing 40 described above. This has further functions, as follows connection of the active wheel spoiler to a suitable structure in the motor vehicle front end, housing of the entire displacement kinematic system, including the fixed bearing points for the levers/couplers of the multi-joint mechanism, shielding of the resulting hole in the underbody from the rest of the engine compartment or an equipment assembly compartment in the front-end or rear region of the motor vehicle, which is particularly useful for reducing external noise and for reasons of contamination, due to an appropriate shaping, the housing 40 can partially assume the previous geometries on the bumper, lower stiffener (only in the front-end region of the motor vehicle) and wheel housing shell.

The housing 40 or the air deflection device 28 is preferably designed in such a way that it can be installed, i.e., used, on the motor vehicle as a modular unit, i.e., as a whole. Of course, it is also possible to replace a housing quickly and easily. According to a further development, it is provided that the air deflection devices 28, which are arranged at a height of an axle of the motor vehicle on both sides and which are operated by means of a common actuator 70, can be pre-assembled together with these as an already functional assembly unit and can be installed together on the motor vehicle. This eliminates the need for time-consuming coupling/connection work during assembly on the motor vehicle.

A particularly advantageous feature of the exemplary embodiment of the drive for displacing the air deflection element 30 described in the figures is that a common actuator 70 is provided for the two air deflection elements 30 arranged in line with the front or rear wheels. For this purpose, the actuator 70 is drivingly coupled to these air deflection elements 30 via at least one Bowden cable. Since the drive is designed in such a way that the actuator 70 pulls the corresponding active wheel spoiler/the air deflection element 30 into the retracted position against the spring force and the wheel spoiler/the air deflection element 30 is not or does not have to be force-loaded by the drive in its extended position, the air deflection element can simply be moved back or into the retracted position in the event of contact with an obstacle, wherein the Bowden cable does not block this displacement and preferably only forms one loop. A decoupling of the drive from the air deflection element in the extended position thereof is therefore neither necessary nor provided for with this type of drive, so that it is particularly cost-effective.

Lastly, it remains to be noted that in a particularly preferred exemplary embodiment of the air deflection device 28, the air deflection element 30 is displaced into the extended position substantially without external force and rather due to its weight. The spring element 58 serves substantially to absorb the dynamic masses and to counteract the dynamic pressure when the vehicle is being driven. This prevents the air deflection element 30 from flapping.

The invention claimed is:

1. An air deflection device of an underbody region of a motor vehicle, comprising:
   an air deflection element, wherein the air deflection element is a wheel spoiler that is disposed in front of a wheel of the motor vehicle in a longitudinal direction of the motor vehicle; and
   a displacement kinematic system;
   wherein the air deflection element is mounted on a downwardly open housing by the displacement kinematic system and is displaceable by the displacement kinematic system from an extended deflection position, in which the air deflection element with a deflection surface provided in a front region of the air deflection element in the longitudinal direction of the motor vehicle diverts an airflow hitting the air deflection element in the underbody region in a forward direction of travel of the motor vehicle, into an at least partially retracted position;
   wherein the air deflection element is displaceable by the displacement kinematic system rearwards in the longitudinal direction of the motor vehicle and upwards in a vertical direction of the motor vehicle and is pushable back in a direction of the retracted position in an event of an obstacle-related force component acting on the air deflection element in the longitudinal direction of the motor vehicle;
   wherein the displacement kinematic system is assigned a displacement unit comprising a tension spring element, wherein the tension spring element is connected to the housing by a first joint of the tension spring element and is connected to a control lever of the displacement kinematic system by a second joint of the tension spring element, wherein the air deflection element is movable by the tension spring element from the retracted position into the deflection position by relaxing the tension spring element and/or is holdable by the tension spring element in the deflection position against a stop, and wherein the air deflection element is pushable back in the direction of the retracted position in the event of the obstacle-related force component acting on the air deflection element by tensioning the tension spring element;
   wherein an actuator is connected to the displacement kinematic system by a pulling device, wherein the pulling device is connected to the actuator at a first end and is connected to the control lever of the displacement kinematic system at a second end, and wherein the pulling device is a cable.

2. The air deflection device according to claim 1, wherein the displacement kinematic system is a multi-joint lever kinematic system.

3. The air deflection device according to claim 1, further comprising an additional air deflection element that is movable from a respective retracted position into a respective deflection position by the displacement unit.

4. A motor vehicle, comprising:
   the air deflection device according to claim 1.

* * * * *